US007672391B2

(12) United States Patent
Kamerman et al.

(10) Patent No.: US 7,672,391 B2
(45) Date of Patent: *Mar. 2, 2010

(54) MIMO RECEIVERS HAVING ONE OR MORE ADDITIONAL RECEIVE PATHS

(75) Inventors: Adriaan Kamerman, Nieuwegein (NL); Isabella Modonesi, De Bilt (NL); Tim Schenk, Eindhoven (NL); Xiao-Jiao Tao, Losser (NL); Allert van Zelst, Woerden (NL)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/250,795

(22) Filed: Oct. 14, 2008

(65) Prior Publication Data

US 2009/0041153 A1 Feb. 12, 2009

Related U.S. Application Data

(63) Continuation of application No. 10/952,400, filed on Sep. 28, 2004, now Pat. No. 7,453,949.

(60) Provisional application No. 60/528,170, filed on Dec. 9, 2003.

(51) Int. Cl.
*H04B 7/02* (2006.01)

(52) U.S. Cl. .................................................. 375/267

(58) Field of Classification Search ................ 375/260, 375/267, 347; 370/208, 210
See application file for complete search history.

(56) References Cited

U.S. PATENT DOCUMENTS

| 4,199,660 A | 4/1980 | Dill et al. ..................... 370/307 |
| 5,991,273 A | 11/1999 | Abu-Dayya .................. 370/252 |
| 6,370,129 B1 | 4/2002 | Huang ........................ 370/329 |
| 6,393,051 B1 | 5/2002 | Koizumi et al. .............. 375/220 |
| 6,947,509 B1 | 9/2005 | Wong .......................... 375/350 |
| 2002/0089923 A1 | 7/2002 | Yoshida et al. ............... 370/208 |
| 2002/0196842 A1 | 12/2002 | Onggosanusi et al. ....... 375/148 |
| 2003/0072452 A1 | 4/2003 | Mody et al. .................. 380/274 |

(Continued)

FOREIGN PATENT DOCUMENTS

EP    1 043 875 A2    10/2000

(Continued)

OTHER PUBLICATIONS

"Performance Comparison of MF and MMSE Combined Iterative Soft Interference Canceller and V-BLAST technique in MIMI/OFDM Systems," by Takumi Ito et al., Vehicular Technology Conference, vol. 1, 2003, pp. 488-492, XP010701011.

*Primary Examiner*—Don N Vo
(74) *Attorney, Agent, or Firm*—Mendelsohn, Drucker & Associates, P.C.; Steve Mendelsohn

(57) ABSTRACT

In a multiple-input, multiple-output (MIMO) system, a receiver is implemented with at least one additional receive path beyond the number of transmit antennas used to transmit the signals (e.g., wireless OFDM signals) received at the receiver. In one embodiment, the additional receive path is used to reduced co-channel interference (CCI) in the recovered OFDM signals. In particular, each receive path applies recursive filtering to generate separate subcarrier signals. A processor converts the separate subcarrier signals from the different receive paths into a first set of subcarrier signals corresponding to each transmitted OFDM signal, where each first set of subcarrier signals has desired signal and possibly CCI. The processor also generates a second set of subcarrier signals corresponding to the CCI. The processor subtracts portions of the second set of subcarrier signals from each first set of subcarrier signals to generate recovered OFDM signals having reduced CCI.

25 Claims, 5 Drawing Sheets

U.S. PATENT DOCUMENTS

| | | |
|---|---|---|
| 2003/0218973 A1 | 11/2003 | Oprea et al. ............... 370/210 |
| 2004/0062193 A1* | 4/2004 | Ma et al. ................... 370/208 |
| 2004/0062302 A1 | 4/2004 | Fujii et al. ................. 375/232 |
| 2006/0239370 A1* | 10/2006 | Mody et al. ................ 375/260 |

FOREIGN PATENT DOCUMENTS

| | | |
|---|---|---|
| EP | 1 152 548 A1 | 11/2001 |
| EP | 1 152 576 A1 | 11/2001 |
| EP | 1 158 716 A2 | 11/2001 |
| EP | 1 185 001 A2 | 3/2002 |
| EP | 1 206 061 A1 | 5/2002 |
| WO | WO 03/041300 A1 | 5/2003 |

\* cited by examiner

US 7,672,391 B2

MIMO RECEIVERS HAVING ONE OR MORE ADDITIONAL RECEIVE PATHS

CROSS-REFERENCE TO RELATED APPLICATIONS

This application is a continuation of U.S. patent application Ser. No. 10/952,400, filed Sep. 28, 2004 and issued as U.S. Pat. No. 7,453,949 on Nov. 18, 2008, which itself claims the benefit of the filing date of U.S. provisional application No. 60/528,170, filed on Dec. 9, 2003, the teachings of which are incorporated herein by reference.

BACKGROUND OF THE INVENTION

1. Field of the Invention

The present invention relates to wireless communications, and, in particular, to receivers for multiple-input, multiple-output (MIMO) systems, such as MIMO orthogonal frequency division multiplexing (OFDM) wireless local area network (WLAN) systems.

2. Description of the Related Art

In a conventional M×M MIMO-OFDM WLAN system, a transmitter with M transmit antennas transmits M OFDM signals (a type of multi-carrier signal) to a receiver having M receive paths that are used to generate M recovered versions of the transmitted OFDM signals.

FIG. 1 shows a block diagram of the front end of a prior-art receiver 100 for use in a conventional 2×2 (i.e., M=2) MIMO-OFDM WLAN system. As shown in FIG. 1, 2×2 receiver 100 has two receive paths 102 and a processor 104. Each receive path 102 has a receive antenna 106, an RF/analog block 108, an analog-to-digital converter (ADC) 110, a cyclic-prefix (CP) removal block 112, and a fast Fourier transform (FFT) block 114.

Within each receive path 102, receive antenna 106 receives mixed versions of the M OFDM signals transmitted by a two-antenna MIMO-OFDM WLAN transmitter. In RF (radio frequency) implementations, RF/analog block 108 downconverts the analog RF OFDM signals from receive antenna 106 to an intermediate frequency (IF) or baseband, and ADC 110 digitizes the resulting downconverted analog OFDM signals to form a digital stream consisting of OFDM symbols separated by cyclic prefixes. CP removal block 112 removes the cyclic prefixes from between the OFDM symbols in the digital stream. FFT block 114 converts frames (e.g., 20 msec) of digital OFDM symbols in the time domain into frequency-domain coefficients for different OFDM subcarrier signals.

Processor 104 has a matrix 116 for each subcarrier in the multi-carrier OFDM signals. Each matrix 116 receives, from the different FFT blocks 114, all of the coefficients for one of the OFDM subcarriers. Note that the data from each FFT block 114 typically contains information for OFDM signals transmitted from all of the transmit antennas. Each matrix 116 is adapted to process the set of corresponding subcarrier coefficients to recover separate and equalized subcarrier coefficient streams 118, each different recovered subcarrier coefficient stream 118 corresponding to the OFDM signal transmitted from a different transmit antenna. Although not shown in FIG. 1, the recovered OFDM subcarrier coefficient streams 118 can then be processed using conventional OFDM decoding techniques, e.g., to detect the data encoded in the received OFDM signals.

One problem with MIMO-OFDM WLAN systems relates to co-channel interference (CCI), where a receiver simultaneously receives signals from spatial locations other than those of the transmitters of interest. CCI can occur when one or more additional transmitters operate at the same channels (e.g., using the same OFDM subcarriers) as the transmitters of interest, such that signals from the additional transmitter(s) interfere with the recovery of the desired signals from the transmitters of interest. Another scenario of CCI occurrence may be due to poor channel selectivity filtering of the receiver, where adjacent channel signals fold into the channel of the interest.

SUMMARY OF THE INVENTION

Problems in the prior art are addressed in accordance with the principles of the present invention by a MIMO-OFDM WLAN system having an M-antenna transmitter and a receiver having (M+1) receive paths. Advantageously, the additional receive path in the receiver of a MIMO-OFDM WLAN system can be used to reduce co-channel interference.

In one embodiment, the present invention is a receiver for receiving M multi-carrier signals transmitted from M transmit antennas, where M>1. The receiver comprises at least (M+1) receive paths and a processor. Each receive path is adapted to receive the M multi-carrier signals and separate the received signals into separate subcarrier signals, and the processor is adapted to process the separate subcarrier signals to generate a recovered version of each of the M transmitted multi-carrier signals.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 2:
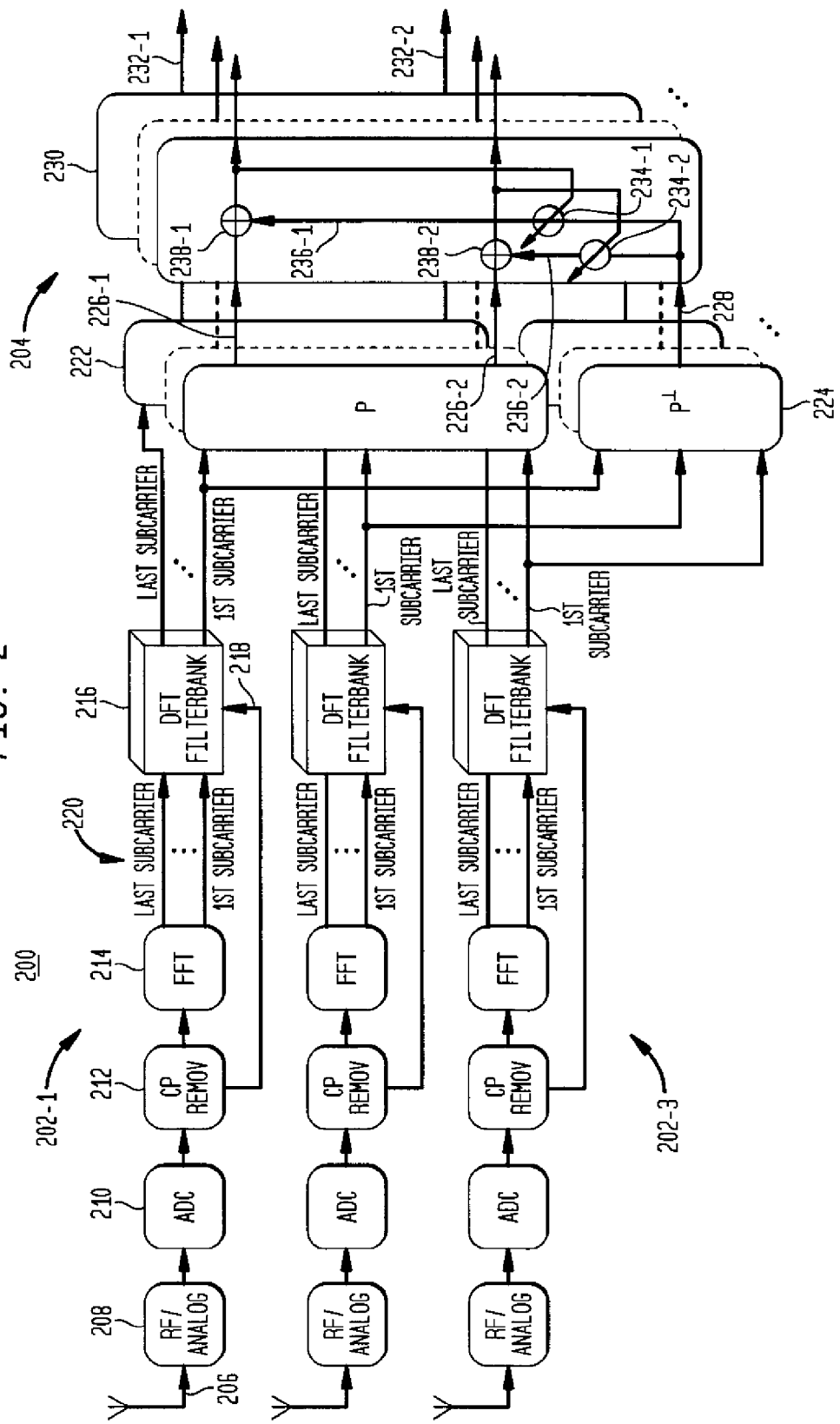
FIG. 2 shows a block diagram of the front end of a receiver, according to one embodiment of the present invention.

FIG. 2 shows a block diagram of the front end of a receiver 200, according to one embodiment of the present invention. As shown in FIG. 2, receiver 200 has three receive paths 202 and a processor 204. Receiver 200 is designed to receive and process two OFDM signals transmitted from a transmitter having two transmit antennas, where the receiver generates recovered versions of those two OFDM signals. As such, in this particular embodiment, receiver 200 has one more receive path than the number of transmitted OFDM signals it is designed to recover.

Figure 1:
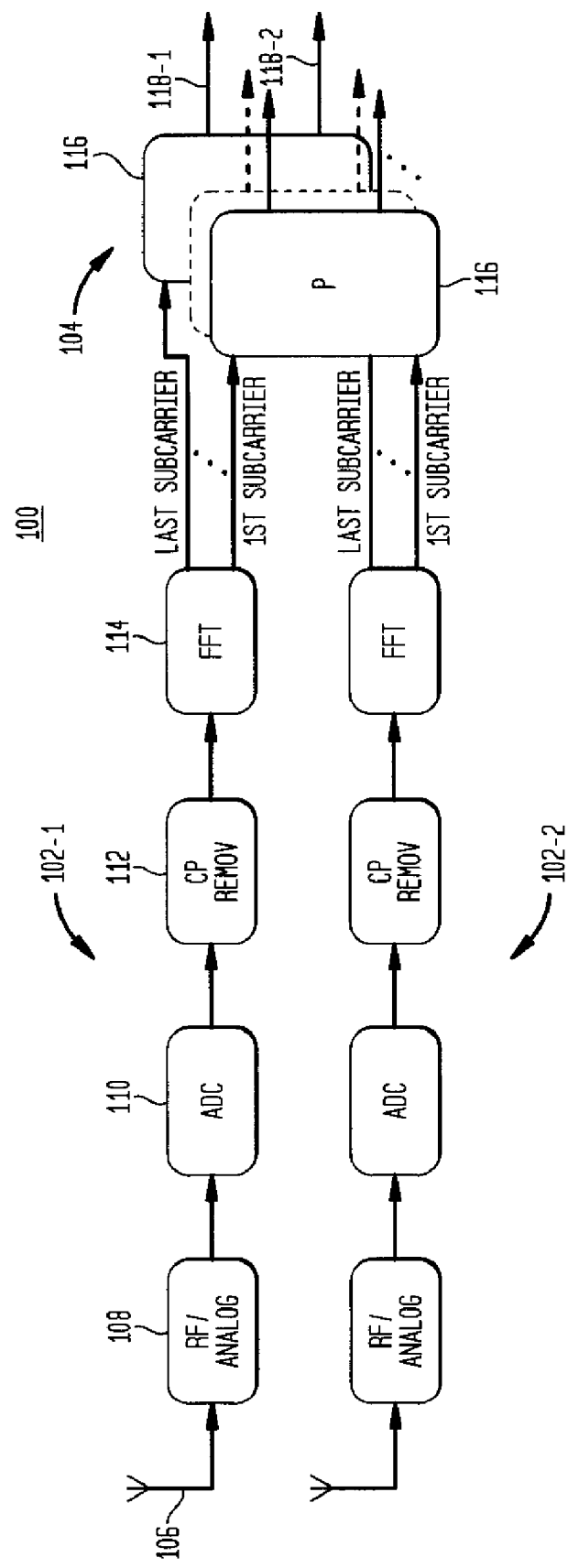
FIG. 1 shows a block diagram of the front end of a prior-art receiver for use in a conventional 2×2 MIMO-OFDM WLAN systems.

Each receive path 202 has a receive antenna 206, an RF/analog block 208, an ADC 210, a CP removal block 212, and an FFT block 214, each of which is analogous to the corresponding element in the receive paths of prior-art receiver 100 of FIG. 1. In addition, however, each receive path 202 has a filterbank 216, which generates subcarrier coefficient streams in the frequency domain for application to processor 204.

Analogous to CP removal block 112 of FIG. 1, CP removal block 212 removes the cyclic prefixes from between the OFDM symbols in the digital stream received from ADC 210. In addition, however, CP removal block 212 provides these removed CP portions 218 from the guard-time intervals between consecutive OFDM symbols to filterbank 216. In alternative implementations, the entire digital stream from ADC 210 can be used by filterbank 216.

Figure 3:
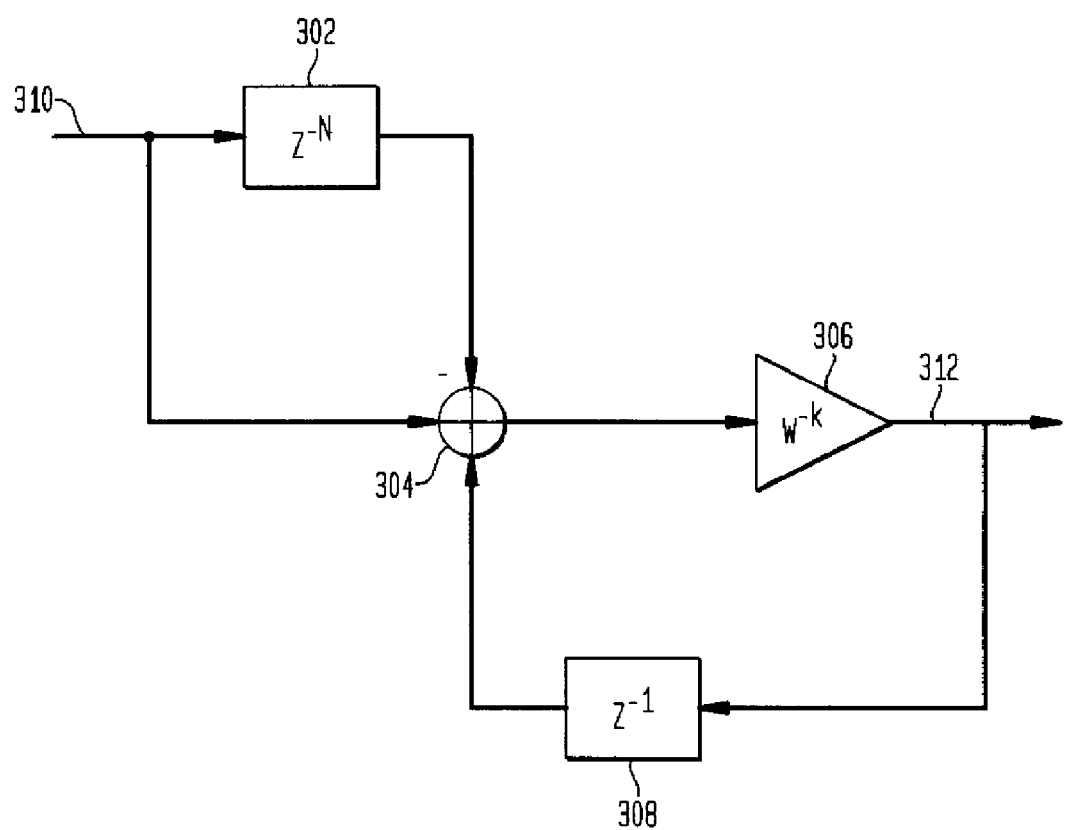
FIG. 3 shows a block diagram of a filter that can be used for each subcarrier in each filterbank of FIG. 2.

FIG. 3 shows a block diagram of a filter 300 that can be used for each subcarrier in each filterbank 216 of FIG. 2. Filter 300 comprises delays 302 and 308, summation node 304, and amplifier 306. Input signal 310 is applied to delay 302 and to summation node 304. Delay 302 delays input signal 310 for N cycles, where N is the size of the FFT and is typically set equal to the number of subcarriers. The output from delay 302 is inverted and applied to summation node 304. The output from summation node is output signal 312, which is also applied to amplifier 306. The output from amplifier 306 is applied to one-cycle delay 308, whose output is also applied to summation node 304.

The filtering of filter 300 for the kth subcarrier can be represented by the recursive relation of Equation (1) as follows:

$$X_k(i+1) = W^{-k}[X_k(i) + x(i+N) - x(i)] \quad (1)$$

where $x(i+N)$ is input signal 310, $X_k(i+1)$ is output signal 312, and $X_k(i)$ is given by Equation (2) as follows:

$$X_k(i) = \sum_{n=0}^{N-1} x(n+i) W^{nk}, \quad (2)$$

where $W = e^{-j\frac{2\pi}{N}}$.

Input signal 310 for filter 300 is indicated in FIG. 2 by signal 218, while filter 300 is initialized using the kth subcarrier signal 220 from FFT 214 of FIG. 2 as $X_k(0)$ in Equation (1). Since $W^{-k}$ has a fixed value, amplifier 306 can be efficiently implemented using adders without requiring any multipliers.

Figure 4:
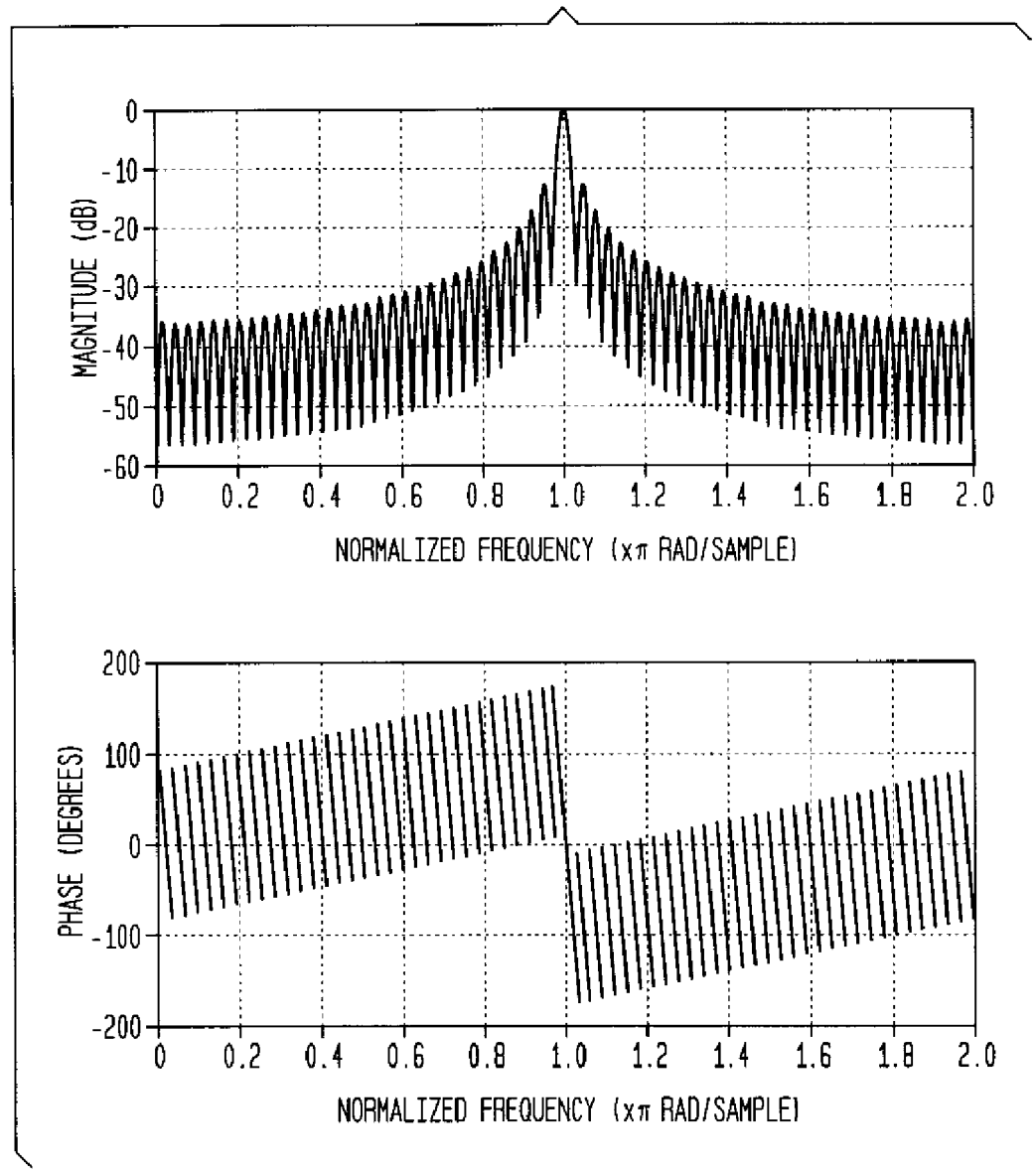
FIG. 4 shows the frequency response of the filter of FIG. 3.

FIG. 3 shows one possible filter structure for a discrete Fourier transform (DFT) filterbank. The DFT filterbank of FIG. 3 may be viewed as an (N−1)-tap finite impulse response (FIR) filter, whose frequency response sample is shown in FIG. 4. Those skilled in the art will understand that other possible implementations exist for filterbank 216. For example, filterbank 216 can be implemented using any suitable filter structure that implements a sliding-window DFT.

As shown in FIG. 2, the subcarrier coefficients from filterbank 216 of each receive path 202 are applied to corresponding P blocks 222 (also referred to as the master blocks) and $P^\perp$ (pronounced "P-orthogonal") blocks 224 (also referred to as the slave blocks) of processor 204. Each P block 222 converts the three corresponding coefficient streams from the three receive paths into two (signal+CCI) coefficient streams 226, each corresponding to a different one of the two transmitted OFDM signals and each containing the corresponding desired signal as well as possibly co-channel interference. Meanwhile, each $P^\perp$ block 224 converts the three corresponding coefficient streams from the three receive paths into a single CCI coefficient stream 228, corresponding to the possible co-channel interference. The operations of master and slave blocks P and $P^\perp$ are estimated during the OFDM long-preamble training phase.

In a conventional, prior-art M×M MIMO-OFDM system, the master block (e.g., P matrix 116 of FIG. 1) performs an inverse of the estimated channel matrix H (i.e., $P=H^{-1}$), where the channel matrix is estimated by sequentially physically placing M−1 spatial nulls to individually extract one desired signal at a time at one output port and then equalizing it.

In an M×(M+1) MIMO-OFDM of the present invention, $H^{-1}$ does not exist, and the master block P has a slightly different meaning. If no CCI present in the long-preamble training phase, then the master block can be derived as a pseudo-inverse, generalized inverse, or Moore-Penrose inverse (i.e., $P=H^\sim$) by performing additional maximum-ratio combining by adjusting the extra null available. This creates a possibility for diversity gain in a later decoding phase if CCI does not subsequently occur. If there is CCI during the long-preamble training phase, then the master block P performs interference cancellation by adjusting the extra available null. In this case, no diversity gain can be expected in the later decoding phase.

A single subcarrier can be modeled according to Equation (3) as follows:

$$Y = SH + vJ + \epsilon, \quad (3)$$

where:

Y is the T×(M+1) matrix for the received symbol, where T is the number of transmitted training symbols per transmitter;

S is the T×M matrix for the known training symbol;

H is the M×(M+1) matrix for the unknown channel transfer function;

v is the T×1 vector for the unknown CCI;

J is the 1×(M+1) vector for the unknown CCI channel transfer function; and $\epsilon$ is an T×(M+1) matrix, whose elements are identically independently distributed, complex, circularly symmetric, white Gaussian noise, $\epsilon_{i,j} \sim N(0, \sigma^2)$.

Maximum likelihood estimation (MLE) may be used to solve Equation (3) because of its asymptotic optimality (in approaching the Cramer-Rao lower bound (CRLB)). Assuming white Gaussian noise, this is equivalent to least-square estimation (LSE) or a weighted version of LSE. Assuming the absence of CCI, the master block P can be represented according to Equation (4) as follows:

$$P = \hat{H}_{MLE}^\sim, \quad (4)$$

where:

$$\hat{H}_{MLE} = \hat{H}_{LSE} = \min_{\hat{H}} \|Y = SH\| = S^\sim Y. \quad (5)$$

Since the training symbol S is known, the matrix $S^\sim = (S^H S)^{-1} S^H$ can be calculated in advance and stored in memory, where $S^H$ is the Hermitian transpose of S.

Although singular value decomposition (SVD) can be used, the pseudo-inverse operation ($[\bullet]^\sim$) may also be calculated explicitly. Such an approach may be improved by using MLE in a general covariance case that models the unknown interference and white Gaussian noise as one multivariate, normally distributed noise. This can be shown to be equivalent to optimization of a determinant criterion.

Since the basic function of master blocks 222 is demultiplexing, an alternative approach may be a direct LS solution, as represented by Equation (6) as follows:

$$P = \min \|YP - S\| = Y^\sim S. \quad (6)$$

This is referred to as partial channel inverse estimation, since the "CCI channel," a part of the channels for all received signals, is unknown. As shown in the following derivation, the result is an unbiased estimate.

Substituting Y=XG, where X=[S v] and G=[$H^H$ $J^H$]$^H$, into Equation (6), yields Equation (7) as follows:

$$P = Y^{\sim}S \qquad (7)$$
$$= (Y^H Y)^{-1} Y S$$
$$= (G^H X^H X G)^{-1} G^H X^H S$$
$$= G^{-1}(X^H H)^{-1} X^H X \begin{bmatrix} I_M \\ 0 \end{bmatrix}$$
$$= G^{-1} \begin{bmatrix} I_M \\ 0 \end{bmatrix}$$

and the demultiplexed signals can be written according to Equation (8) as follows:

$$YP = (SH + vJ)P \qquad (8)$$
$$= [S \; v] G G^{-1} \begin{bmatrix} I_M \\ 0 \end{bmatrix}$$
$$= S$$

Note that Equation (8) has no bias term and no self-interference.

Unlike the approach of Equation (4), the solution to Equation (6) may require singular value decomposition, which may be implemented using the CORDIC-based VLSI architecture described by Y. Hu, "CORDIC-based VLSI architectures for digital signal processing," IEEE Signal Processing Magazine, vol. 9, no. 3, pp. 16-35, July 1992, the teachings of which are incorporated herein by reference. The rank of Y may vary from 1 to M+1 depending on the channel condition and whether any CCI is present. If the repeated-preamble is adopted, then successive cancellation may be used.

Figure 5:
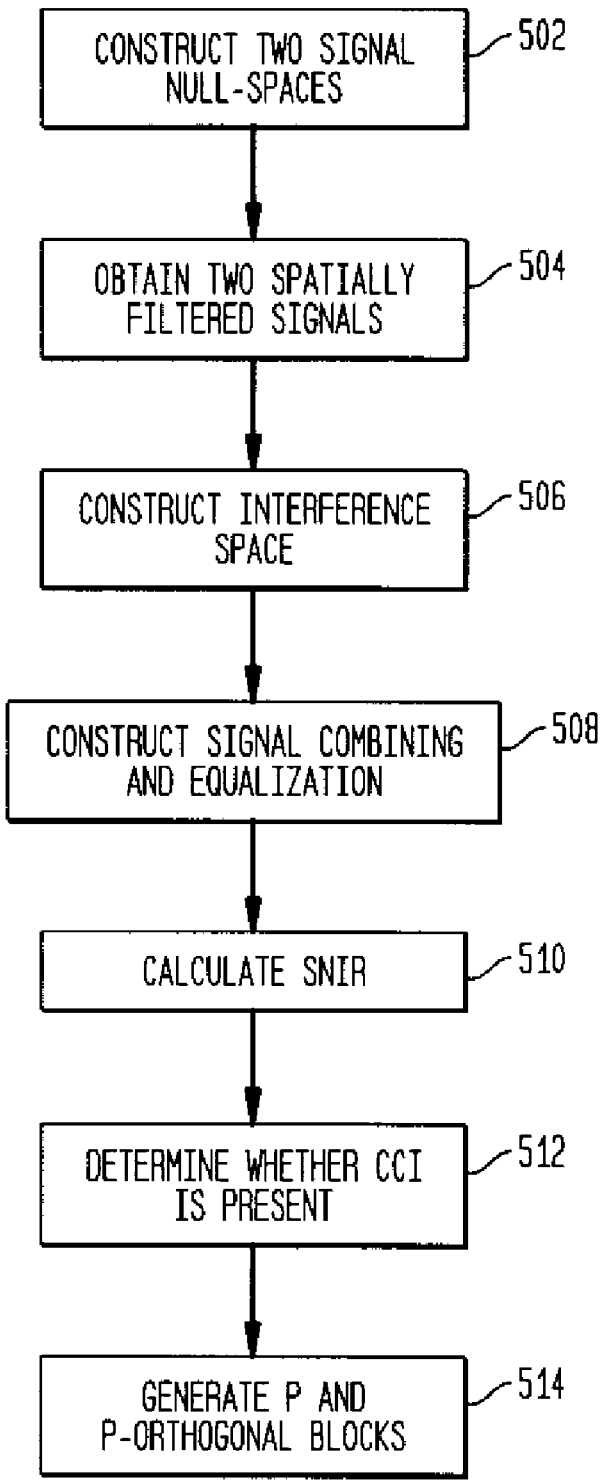
FIG. 5 shows a flow diagram of one possible successive cancellation algorithm for a 2×3 MIMO system.

FIG. 5 shows a flow diagram of one possible successive cancellation algorithm for a 2×3 MIMO system. First, at step 502, construct two signal null spaces as follows:

$$Z_1 = \begin{bmatrix} -c_1 & 1 & 0 \\ -c_2 & 0 & 1 \end{bmatrix},$$

$$c_i = \min_{c_i} \|y_{1:2,i+1} - c_i y_{1:2,1}\| = \frac{y_{1:2,1}^H y_{1:2,i+1}}{y_{1:2,1}^H y_{1:2,1}},$$

(null out TX1 when TX1 is on)

$$Z_2 = \begin{bmatrix} -c_1 & 1 & 0 \\ -c_2 & 0 & 1 \end{bmatrix},$$

$$c_i = \min_{c_i} \|y_{3:4,i+1} - c_i y_{3:4,1}\| = \frac{y_{3:4,1}^H y_{3:4,i+1}}{y_{3:4,1}^H y_{3:4,1}},$$

(null out TX2 when TX2 is on)

where $y_{1:2,i+1}$ denotes the received signals at the (i+1)th receiver when the first transmitter (TX1) is on, while $y_{3:4,i+1}$ denotes the received signals at the (i+1)th receiver when the second transmitter (TX2) is on.

Next, at step 504, obtain two spatially filtered signals as follows:

$$X^{(1)} = Y_{1:2,1:3} Z_2$$

$$X^{(2)} = Y_{3:4,1:3} Z_1$$

Next, at step 506, construct interference space as follows:

$$Z_3 = [-c \; 1],$$

$$c = \min_c \|X_{1:2,2} - c X_{1:2,1}\| = \frac{X_{1:2,1}^{(1)H} X_{1:2,2}^{(1)}}{X_{1:2,1}^{(1)H} X_{1:2,1}^{(1)}},$$

(null out both TX1 and TX2)

Next, at step 508, construct signal combining and equalization as follows:

$$E_1 = [e_1 \; e_2](e_1^H e_1 + e_2^H e_2)^{-1},$$

$$E_2 = [e_3 \; e_4](e_3^H e_3 + e_4^H e_4)^{-1}$$

where $e_1 = \frac{S_{1:2,1}^H X_{1:2,1}^{(1)}}{S_{1:2,1}^H S_{1:2,1}}$, $$e_2 = \frac{S_{1:2,1}^H X_{1:2,2}^{(1)}}{S_{1:2,1}^H S_{1:2,1}},$$

$$e_3 = \frac{S_{3:4,2}^H X_{1:2,1}^{(2)}}{S_{3:4,2}^H S_{3:4,2}},$$

$$e_4 = \frac{S_{3:4,2}^H X_{1:2,2}^{(2)}}{S_{3:4,2}^H S_{3:4,2}}$$

Next, at step 510, calculate the signal-to-noise&interference ratio (SNIR) as follows:

$$SNIR = \frac{tr(S^H S)}{(Y_{1:2} Z_2 E_1 - S_{1:2,1})^H (Y_{1:2} Z_2 E_1 - S_{1:2,1}) + (Y_{3:4} Z_1 E_2 - S_{3:4,2})^H (Y_{3:4} Z_1 E_2 - S_{3:4,2})}$$

Next, at step 512, if the SNIR is less than 22 (27 dB), then there is CCI present, implying the following:

$$E_1 = (X^{(1)})^{-1} S_{1:2,1}, \; E_2 = (X^{(2)})^{-1} S_{3:4,2}$$

Finally, at step 514, the master and slave blocks P and $P^\perp$ are derived as follows:

$$P = [Z_2 E_1 Z_1 E_2]$$

$$P^\perp = Z_2 Z_3$$

As shown in FIG. 2, the outputs from P blocks 222 and $P^\perp$ blocks 224 are applied to corresponding CCI cancellation blocks 230, which apply a cancellation scheme to reduce the amount of CCI in the two coefficient streams 226 to generate corresponding output coefficient streams 232. In one implementation, each cancellation block 230 applies an adaptive scheme based on a typical Wiener-Hopf solution, where each pair of P blocks 222 are master blocks and the corresponding $P^\perp$ block 224 is a slave block whose output 228 is used as a reference signal in the adaptive cancellation scheme. Information from each output coefficient stream 232 is fed back to determine how to distribute CCI coefficient stream 228 between the two (signal+CCI) coefficient streams 226.

In particular, each output coefficient stream 232 is fed back to a corresponding scaler 234, which applies an appropriate scale factor to CCI coefficient stream 228 based on the energy or power level of the output coefficient stream. The resulting scaled coefficient stream 236 is then subtracted from the corresponding (signal+CCI) coefficient stream 226 at a subtraction node 238 to generate the corresponding output coefficient stream 232. The scale factors can be calculated in a batch way (e.g., using direct projection) or in a recursive way (e.g., using a least mean squares (LMS) algorithm or a sign algorithm (SA)). SA is a simplified LMS, where only the sign of the error is fed back, while LMS also feeds back the magnitude of the error. See, e.g., Simon Haykin, *Adaptive Filter Theory*, (4th Edition), Prentice Hall, 2001 (ISBN: 0130901261), the teachings of which are incorporated herein by reference.

Although the present invention has been described in the context of a MIMO-OFDM WLAN system having a two-antenna transmitter and a receiver having three receive paths, the invention is not so limited. In general, the invention can be extended to any number M, where the system has an M-antenna transmitter and a receiver having (M+1) receive paths. Moreover, for a system having an M-antenna transmitter, the invention can be implemented as a receiver having more than (M+1) receive paths. These additional receive paths could be used to trade off between additional diversity gain and suppression of co-channel interference, where diversity gain refers to an increase in robustness against channel fading. Furthermore, with some minor modifications, the present invention can be implemented in the context of MIMO systems based on suitable modulation schemes other than OFDM, such as code-division multiple-access (CDMA) modulation. Similarly, the present invention can be implemented in the context of suitable systems other than WLANs, such as wireless wide area networks (WWANs). In addition to space-division multiplexing (SDM) schemes, where the M transmitter antennas are located within a single device, the present invention can also be implemented in the context of space-division multiple-access (SDMA) schemes, where the M transmitter antennas are not located within the same device, but rather in multiple devices corresponding to two or more different users.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A receiver for receiving M multi-carrier signals transmitted from M transmit antennas, M>1, the receiver comprising:
   at least (M+1) receive paths, each receive path adapted to receive the M multi-carrier signals and separate the received signals into separate subcarrier signals; and
   a processor adapted to process the separate subcarrier signals to generate a recovered version of each of the M transmitted multi-carrier signals, wherein:
   each receive path comprises:
      a receive antenna adapted to receive the multi-carrier signals;
      an analog-to-digital converter adapted to digitize the received multi-carrier signals; and
      a transform block adapted to convert the digitized multi-carrier signals in a time domain into the separate subcarrier signals in a frequency domain; and
   the transform block comprises:
      a first transformer adapted to convert an initial set of the digitized multi-carrier signals into an initial set of separate subcarrier signals in the frequency domain; and
      a second transformer adapted to convert subsequent sets of the digitized multi-carrier signals into subsequent sets of separate subcarrier signals in the frequency domain based on the initial set of separate subcarrier signals.

2. The invention of claim 1, wherein each receive path further comprises a cyclic prefix removal block adapted to remove a cyclic prefix from the digitized multi-carrier signals prior to application to the transform block.

3. The invention of claim 1, wherein:
   the first transformer is based on a fast Fourier transform; and
   the second transformer is based on a discrete Fourier transform.

4. The invention of claim 1, wherein the second transformer is adapted to apply recursive filtering in converting the subsequent sets of the digitized multi-carrier signals into the subsequent sets of separate subcarrier signals.

5. The invention of claim 4, wherein the recursive filtering of the second transformer is adapted to be initialized based on the initial set of separate subcarrier signals from the first transformer.

6. The invention of claim 1, wherein:
   the multi-carrier signals are orthogonal frequency division multiplexing (OFDM) signals; and
   the receiver is adapted to be configured in a multiple-input, multiple-output (MIMO) wireless local area network (WLAN) system.

7. The invention of claim 1, wherein the second transformer is adapted to generate the subsequent sets of separate subcarrier signals independent of any subsequent sets of separate subcarrier signals generated by the first transformer.

8. A receiver-implemented method for receiving M multi-carrier signals transmitted from M transmit antennas, M>1, the method comprising:
   receiving the M multi-carrier signals at least (M+1) receive paths;
   separating, in each receive path, the received signals into separate subcarrier signals; and
   processing the separate subcarrier signals to generate a recovered version of each of the M transmitted multi-carrier signals, wherein:
      each receive path comprises:
         a receive antenna that receives the multi-carrier signals;
         an analog-to-digital converter that digitizes the received multi-carrier signals; and
         a transform block that converts the digitized multi-carrier signals in a time domain into the separate subcarrier signals in a frequency domain; and
      the transform block comprises:
         a first transformer that converts an initial set of the digitized multi-carrier signals into an initial set of separate subcarrier signals in the frequency domain; and
         a second transformer that converts subsequent sets of the digitized multi-carrier signals into subsequent sets of separate subcarrier signals in the frequency domain based on the initial set of separate subcarrier signals.

9. The invention of claim 8, wherein:
   each receive path further comprises a cyclic prefix removal block that removes a cyclic prefix from the digitized multi-carrier signals prior to application to the transform block;
   the multi-carrier signals are orthogonal frequency division multiplexing (OFDM) signals; and
   the receiver is configured in a multiple-input, multiple-output (MIMO) wireless local area network (WLAN) system.

10. The invention of claim 8, wherein:
   the first transformer is based on a fast Fourier transform; and
   the second transformer is based on a discrete Fourier transform.

11. The invention of claim 8, wherein the second transformer applies recursive filtering in converting the subsequent sets of the digitized multi-carrier signals into the subsequent sets of separate subcarrier signals.

12. The invention of claim 11, wherein the recursive filtering of the second transformer is initialized based on the initial set of separate subcarrier signals from the first transformer.

13. The invention of claim 8, wherein the second transformer generates the subsequent sets of separate subcarrier signals independent of any subsequent sets of separate subcarrier signals generated by the first transformer.

14. A wireless communications system comprising:
   a transmitter having M transmit antennas adapted to transmit M multi-carrier signals, M>1; and
   a receiver having:
      at least (M+1) receive paths, each receive path adapted to receive the M multi-carrier signals and separate the received signals into separate subcarrier signals; and
      a processor adapted to process the separate subcarrier signals to generate a recovered version of each of the M transmitted multi-carrier signals, wherein:
         each receive path comprises:
            a receive antenna adapted to receive the multi-carrier signals;
            an analog-to-digital converter adapted to digitize the received multi-carrier signals; and
            a transform block adapted to convert the digitized multi-carrier signals in a time domain into the separate subcarrier signals in a frequency domain; and
         the transform block comprises:
            a first transformer adapted to convert an initial set of the digitized multi-carrier signals into an initial set of separate subcarrier signals in the frequency domain; and
            a second transformer adapted to convert subsequent sets of the digitized multi-carrier signals into subsequent sets of separate subcarrier signals in the frequency domain based on the initial set of separate subcarrier signals.

15. The invention of claim 14, wherein:
   each receive path further comprises a cyclic prefix removal block adapted to remove a cyclic prefix from the digitized multi-carrier signals prior to application to the transform block;
   the multi-carrier signals are orthogonal frequency division multiplexing (OFDM) signals; and
   the receiver is adapted to be configured in a multiple-input, multiple-output (MIMO) wireless local area network (WLAN) system.

16. The invention of claim 14, wherein:
   the first transformer is based on a fast Fourier transform; and
   the second transformer is based on a discrete Fourier transform.

17. The invention of claim 14, wherein the second transformer is adapted to apply recursive filtering in converting the subsequent sets of the digitized multi-carrier signals into the subsequent sets of separate subcarrier signals.

18. The invention of claim 17, wherein the recursive filtering of the second transformer is adapted to be initialized based on the initial set of separate subcarrier signals from the first transformer.

19. The invention of claim 14, wherein the second transformer is adapted to generate the subsequent sets of separate subcarrier signals independent of any subsequent sets of separate subcarrier signals generated by the first transformer.

20. A receiver for receiving M multi-carrier signals transmitted from M transmit antennas, M>=1, the receiver comprising:
   at least M receive paths, each receive path adapted to receive the M multi-carrier signals and separate the received signals into separate subcarrier signals; and
   a processor adapted to process the separate subcarrier signals to generate a recovered version of each of the M transmitted multi-carrier signals, wherein:
      each receive path comprises:
         a receive antenna adapted to receive the multi-carrier signals;
         an analog-to-digital converter adapted to digitize the received multi-carrier signals; and
         a transform block adapted to convert the digitized multi-carrier signals in a time domain into the separate subcarrier signals in a frequency domain; and the transform block comprises:
- a first transformer adapted to convert an initial set of the digitized multi-carrier signals into an initial set of separate subcarrier signals in the frequency domain; and
- a second transformer adapted to convert subsequent sets of the digitized multi-carrier signals into subsequent sets of separate subcarrier signals in the frequency domain based on the initial set of separate subcarrier signals.

21. The invention of claim 20, wherein:
each receive path further comprises a cyclic prefix removal block adapted to remove a cyclic prefix from the digitized multi-carrier signals prior to application to the transform block;
the multi-carrier signals are orthogonal frequency division multiplexing (OFDM) signals; and
the receiver is adapted to be configured in a multiple-input, multiple-output (MIMO) wireless local area network (WLAN) system.

22. The invention of claim 20, wherein:
the first transformer is based on a fast Fourier transform; and
the second transformer is based on a discrete Fourier transform.

23. The invention of claim 20, wherein the second transformer is adapted to apply recursive filtering in converting the subsequent sets of the digitized multi-carrier signals into the subsequent sets of separate subcarrier signals.

24. The invention of claim 23, wherein the recursive filtering of the second transformer is adapted to be initialized based on the initial set of separate subcarrier signals from the first transformer.

25. The invention of claim 20, wherein the second transformer is adapted to generate the subsequent sets of separate subcarrier signals independent of any subsequent sets of separate subcarrier signals generated by the first transformer.

\* \* \* \* \*